US00RE45236E

(19) United States
(12) Reissued Patent
Husted et al.

(10) Patent Number: US RE45,236 E
(45) Date of Reissued Patent: Nov. 11, 2014

(54) MULTI-CHANNEL BINDING IN DATA TRANSMISSION

(75) Inventors: Paul J. Husted, San Jose, CA (US); William J. McFarland, Los Altos, CA (US); Jeffrey M. Gilbert, Los Altos, CA (US)

(73) Assignee: QUALCOMM Incorporated, San Diego, CA (US)

(21) Appl. No.: 13/231,733

(22) Filed: Sep. 13, 2011

Related U.S. Patent Documents

Reissue of:
(64) Patent No.: 7,620,028
Issued: Nov. 17, 2009
Appl. No.: 10/704,209
Filed: Nov. 6, 2003

(51) Int. Cl.
*H04J 1/00* (2006.01)

(52) U.S. Cl.
USPC ..... 370/343; 370/319; 370/320; 370/321; 370/322; 370/344; 370/345; 370/480; 455/450; 455/451; 455/452.1; 455/452.2; 455/464

(58) Field of Classification Search
USPC ..... 370/319–322, 343, 344, 345, 480; 455/450, 451, 452.1, 452.2, 454, 464
See application file for complete search history.

(56) References Cited

U.S. PATENT DOCUMENTS

| | | | |
|---|---|---|---|
| 4,412,325 | A | 10/1983 | Molo |
| 4,912,422 | A | 3/1990 | Kobayashi et al. |
| 5,031,207 | A | 7/1991 | Hesdahl et al. |
| 5,191,410 | A | 3/1993 | McCalley et al. |
| 5,592,470 | A | 1/1997 | Rudrapatna et al. |
| 5,592,490 | A | 1/1997 | Barratt et al. |
| 5,689,568 | A | 11/1997 | Laborde |
| 5,692,126 | A | 11/1997 | Templeton et al. |
| 5,781,598 | A | 7/1998 | Hardy, III |
| 5,856,999 | A | 1/1999 | Robinson et al. |
| 6,118,796 | A | 9/2000 | Best et al. |
| 6,154,659 | A | 11/2000 | Jalali et al. |
| 6,335,927 | B1 | 1/2002 | Elliott et al. |
| 6,480,494 | B1 | 11/2002 | Hawley |
| 6,539,209 | B1 | 3/2003 | Dajer et al. |
| 6,563,820 | B1 | 5/2003 | Griess |
| 6,601,234 | B1 | 7/2003 | Bowman-Amuah |
| 6,671,500 | B2 | 12/2003 | Damgaard et al. |
| 6,751,772 | B1 | 6/2004 | Kim et al. |
| 6,873,630 | B1 | 3/2005 | Muller et al. |

(Continued)

FOREIGN PATENT DOCUMENTS

| | | | |
|---|---|---|---|
| CN | 1357179 | A | 10/2000 |
| JP | 63108825 | A | 5/1988 |

(Continued)

OTHER PUBLICATIONS

International Search Report and Written Opinion—PCT/US2004/036599, ISA/US, Aug. 17, 2006.

(Continued)

*Primary Examiner* — Steve D Agosta
(74) *Attorney, Agent, or Firm* — Holland & Hart LLP

(57) ABSTRACT

A system and method are described for binding together a plurality of wireless data communications channels, whereby an aggregate throughput improvement is realized. A master channel amongst the channels to be bound is compatible with existing standards-based wireless data communications equipment. The master channel serves to perform MAC association and flow control. Aggregate throughput is improved by sending and receiving either multiple sets of separately encoded packets, commonly encoded packets or redundantly encoded packets.

12 Claims, 6 Drawing Sheets

(56) References Cited

U.S. PATENT DOCUMENTS

| | | | |
|---|---|---|---|
| 6,918,135 | B1 | 7/2005 | Goffin, II |
| 7,002,911 | B1 | 2/2006 | Linville et al. |
| 2002/0116460 | A1 | 8/2002 | Treister et al. |
| 2002/0197998 | A1 | 12/2002 | Schmidt |
| 2003/0035388 | A1 | 2/2003 | Schmidt |
| 2006/0095581 | A1 | 5/2006 | Ali et al. |

FOREIGN PATENT DOCUMENTS

| | | | |
|---|---|---|---|
| JP | 7066739 | A | 3/1995 |
| JP | 7202758 | A | 8/1995 |
| JP | 2001320346 | A | 11/2001 |
| JP | 2003528527 | T | 9/2003 |
| WO | 00/64059 | A2 | 10/2000 |

OTHER PUBLICATIONS

Supplementary European Search Report—EP04810264, Search Authority Munich, May 4, 2011.

ANSI, "Part 11: Wireless LAN Medium Access Control (MAC) and Physical Layer (PHY) Specifications", ANSI/IEEE Std 802.11, 1999 Edition (2003), pp. 3 and 136.

MULTI-CHANNEL BINDING IN DATA TRANSMISSION

Matter enclosed in heavy brackets [ ] appears in the original patent but forms no part of this reissue specification; matter printed in italics indicates the additions made by reissue.

FIELD OF THE INVENTION

The present invention relates to communication systems. More particularly, binding a plurality of communications channels to realize an aggregate throughput improvement is disclosed. The binding feature may be added in a manner that preserves compatibility with existing standards-based wireless data systems.

BACKGROUND OF THE INVENTION

Existing digital wireless communication systems communicate on a single RF channel, as shown by a prior-art standards-compliant client transceiver 120 in FIG. 1. Transceiver 120 receives and transmits digital data via data I/O 122. This data is sent and/or received via antenna 124 to an access point 110 over a single data channel centered about a single RF frequency as illustrated by spectrum 140. An example of such a standards-compliant client is the commercially-available Netgear model WG511 PCMCIA 802.11b/g wireless networking adaptor.

Although technological advances have increased the available digital throughput for any particular assigned frequency channel in a given band, there is always a desire to send data ever more rapidly or with greater integrity than can be accommodated with the single-channel approach. Thus, there is a need in the art for a method and apparatus for binding a plurality of data channels together to achieve aggregate throughput improvement including data rate and/or data integrity improvement.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, are referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and invention may be practiced according to the claims without some or all of these specific details. For the purpose of clarity, technical material that is known in the technical fields related to the invention has not been described in detail so that the invention is not unnecessarily obscured.

Figure 1:
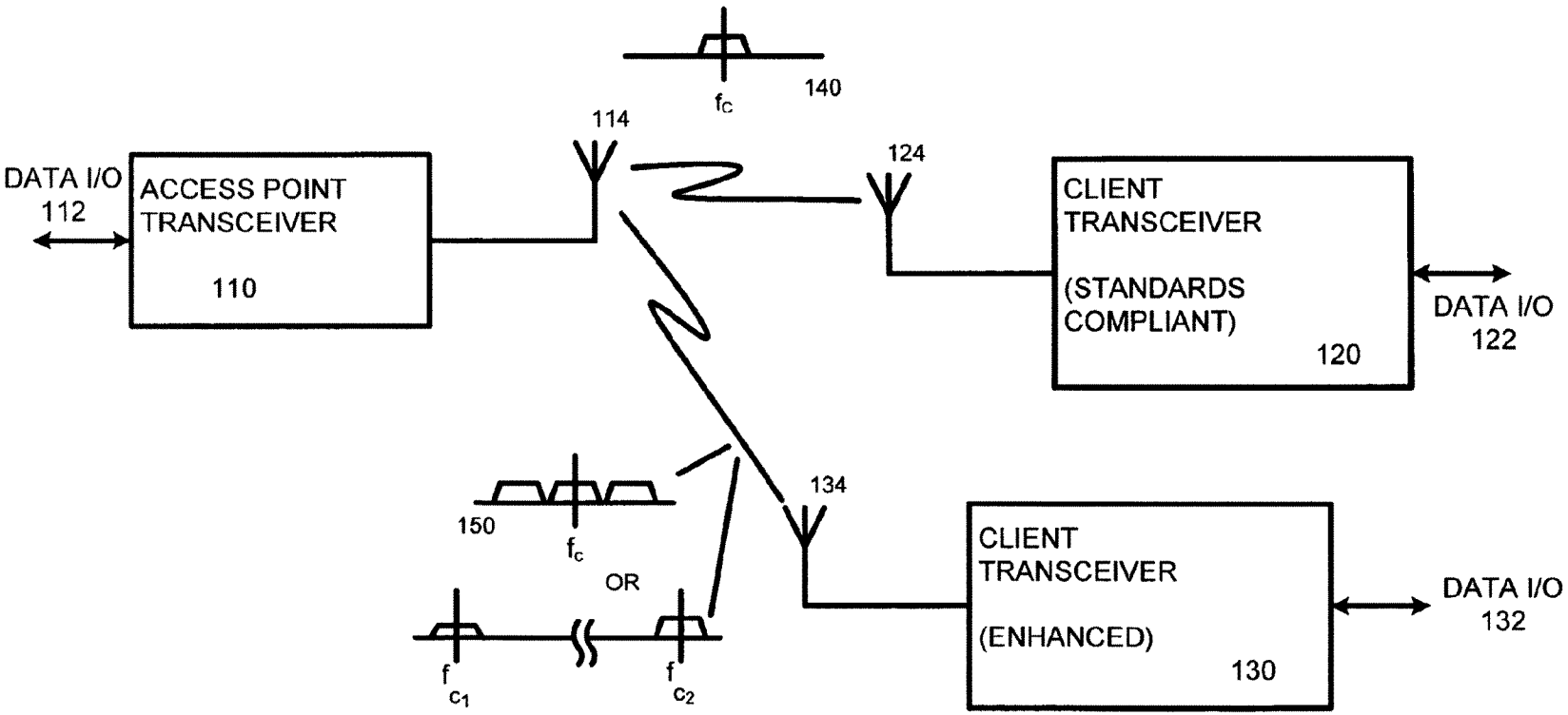
FIG. 1 is a block diagram of a digital communication system showing a prior art communication channel and an advanced communication channel in some embodiments.

FIG. 1 shows an access point transceiver 110 in digital wireless communication with both a client transceiver 120 according to existing digital data wireless standards and a client transceiver 130 according to bound channel communications techniques detailed herein. A single channel 140 is used to communicate between transceivers 110 and 120 while a plurality of bound channels 150 is used to [communicated] *communicate* between transceivers 110 and 130. The binding of multiple channels has the effect of improving aggregate throughput as will be described in detail herein. Multiple channels are considered bound if they are instantiated by a single association between advanced data transceivers. Multiple channels can be bound among multiple channels in a single band or multiple channels in multiple bands. Although any arrangement of channels can advantageously be used when bound, some channel arrangements have further advantages as will be detailed below.

Figure 2:
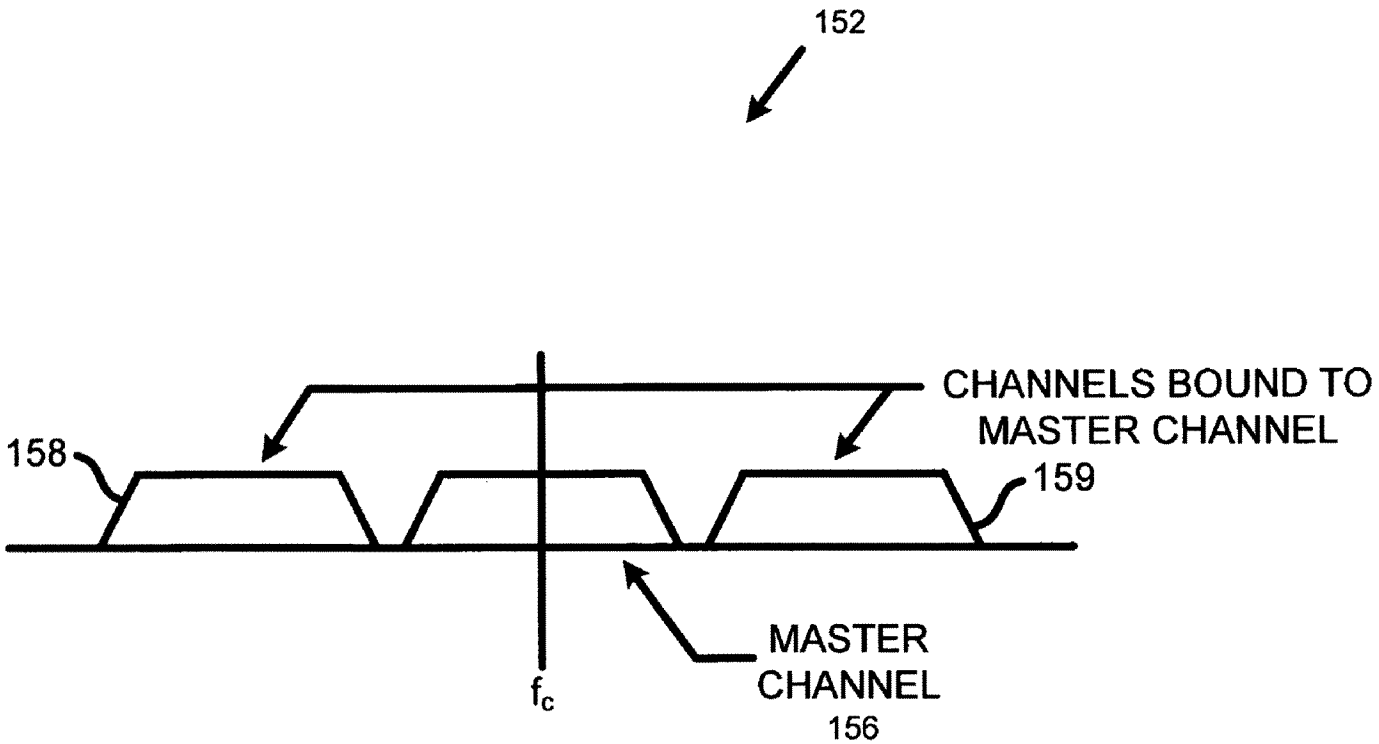
FIG. 2 is a diagram illustrating a spectrum broadcast.

FIG. 2 illustrates a comparison of the prior art spectrum 140 with a spectrum generated and received in one embodiment 152. The spectrum 152 shows three adjacent, non-overlapping transmission channels wherein the center channel is designated the master channel 156. The secondary channels 158, 159 occupy channels substantially equally above and below the master channel's center frequency.

This arrangement of channels is advantageous because when pairs of channels equally offset from a center frequency are operated contemporaneously, undesirable artifacts of the modulation of one channel upon a carrier are manifested in an equally but oppositely displaced, occupied channel. These artifacts might otherwise require expensive suppression to meet the requirements of, for example, the wireless data communications standard IEEE-802.11a. These artifacts are of less importance in prior-art single-channel systems or in the single master channel in some embodiments.

Figure 3A:
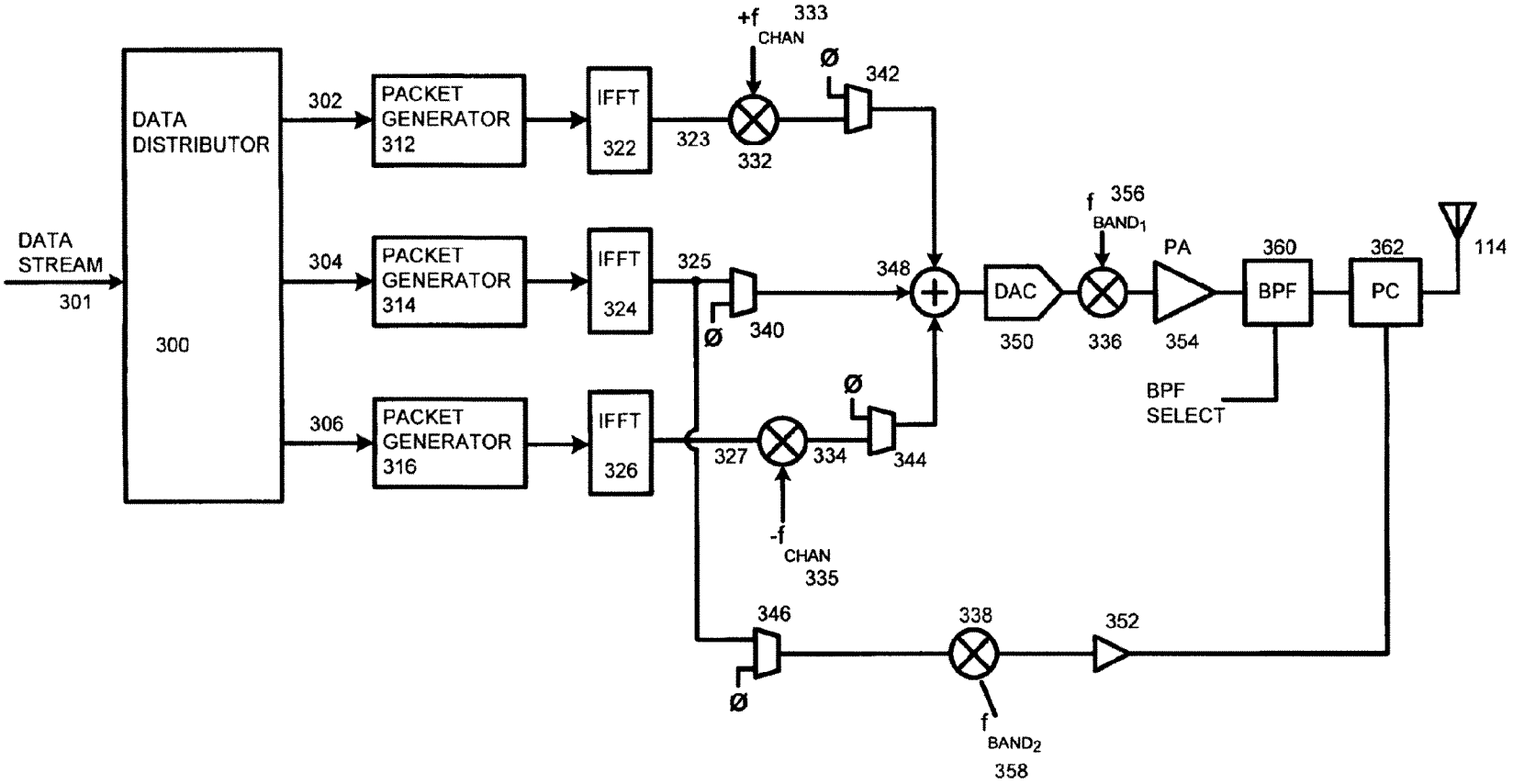
FIGS. 3A-3C are block diagrams illustrating digital communication system encoders.

FIG. 3A shows the interconnection of elements forming the data encoding and modulation portion of one embodiment. A software device driver receives and pre-processes data for transmission. The preprocessing performed by the device driver includes tagging data that can be transmitted by bound channels. An incoming data stream 301 is received by data distributor 300. Data distributor 300 functions to detect tagged data and allocate streams of data to a plurality of encoding channels. Tags may be inserted into data stream 301 by the device driver. If data distributor 300 does not detect such tags, then all data is directed to master channel data stream 304. If data distributor 300 does detect tags, then data is distributed among a plurality of data streams. In the embodiment shown, a multiplexer selectively feeds three buffers, which output data streams 302, 304 and 306. Data streams 302, 304 and 306 are output to their respective packet generators 312, 314 and 316. Data stream 304 is allocated to the master channel and streams 302 and 306 are allocated to secondary channels. In some embodiments, data distributor

300 allocates the data stream that requires the longest transmit time to the master channel and further distributes input stream data to data streams 302 and 306 such that their transmit times are substantially equal.

Packet generators 312, 314 and 316 packetize data in each channel in an appropriate manner. In some embodiments, packetizing is implemented as is described in the IEEE-802.11a standard. IFFT processors 322, 324 and 326 similarly process the packetized data into baseband encoded signals 323, 325 and 327, respectively. Baseband signals 323 and 327 comprise the secondary channel signals and are up converted and down converted by *mixers 332 and 334 using* complex carriers [332] *333* and 335 respectively, carriers [332] *333* and 335 having a frequency equal to the RF band channel spacing. Muxes 340, 342 and 344 allow selective passage of the baseband signals from each chain to summer 348. The output of summer 348 feeds a digital baseband signal to analog converter (DAC) 350. The baseband output of DAC 350 is mixed *by mixer 336* with a local oscillator signal [336] *356* whose frequency places the output signal on a selected channel of a chosen RF band.

Packet generator 314 is associated with the master channel and generates beacons in a manner substantially as described by existing standards such as IEEE-802.11a. The beacon generation in the packet generators 312 and 316 associated with the secondary channels is disabled by the device driver in some embodiments.

Power amplifier 354 boosts the mixed signal to a level suitable for transmission. Selectable bandpass filter (BPF) 360 is, in one embodiment, set to a single-channel width when only the master channel is active and a three-channel width when two adjacent secondary channels are active. *Mux 346 allows selective passage of baseband signal 325 to mixer 338, which mixes the output of mux 346 with a local oscillator signal 358 whose frequency places the output signal on another selected channel of the chosen RF band. Power amplifier 354 boosts the mixed signal to a level suitable for transmission.* In a dual-band embodiment, power combiner 362 combines the output of power amplifier 352 and BPF 360 to feed antenna 114.

The chain of processing from data stream 301 through the output of DAC 350 represents a baseband encoder chain. The chain of processing from the input of mixer 336 to the antenna 114 represents an upconverting transmitter chain.

Figure 3B:
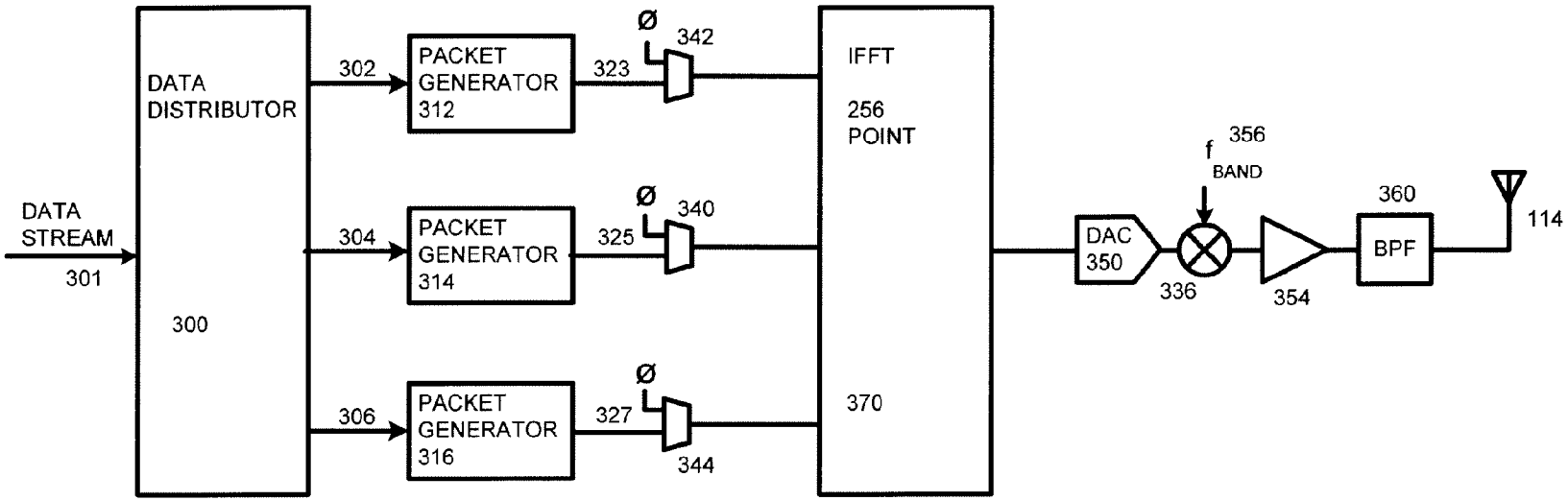

FIG. 3B shows the interconnection of elements forming the data encoding and modulation portion of another embodiment. Here, the three packet streams 323, 325 and 327 are generated as before. Now, however, they feed muxes 342, 340 and 344 directly. The outputs of the three muxes are connected to a 256-point IFFT block 370. 256-point IFFT block 370 creates, in one processing step, an equivalent digital representation of three frequency-adjacent channels as from the output of summer 348, above. The output of 256-point IFFT block 370 feeds DAC 350 and the remainder of the output chain (mixer 336, PA 354 and BPF 360 connected to antenna 114) as in the previously-described embodiment.

Figure 3C:
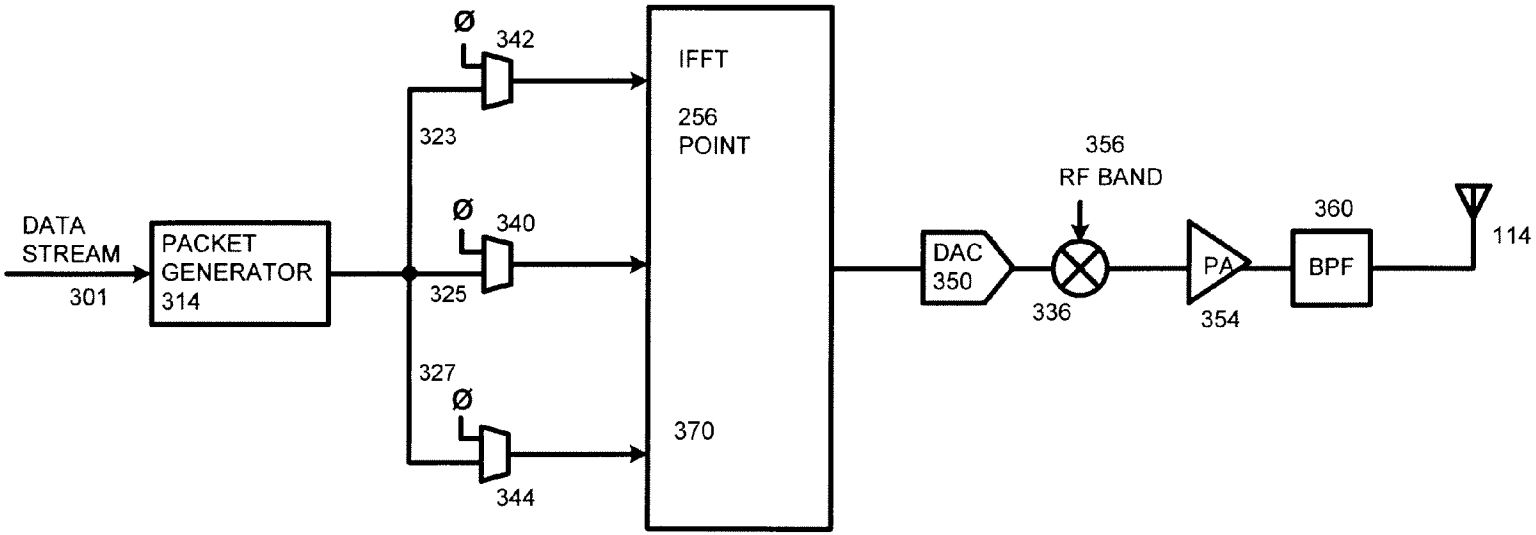

FIG. 3C shows the interconnection of elements forming the data encoding and modulation portion of yet another embodiment. Here, the three packet streams 323, 325 and 327 are generated from a common input data stream 301. Muxes 342, 340 and 344 control packet data inputs to 256-point IFFT block 370. In this manner, three frequency-adjacent channels of redundant data are created. The output of 256-point IFFT block 370 feeds DAC 350 and the remainder of the output chain (mixer 336, PA 354 and BPF 360 connected to antenna 114) as in the previously-described embodiment.

Reception of bound streams is performed by hardware symmetric in function to the encoding described above; data is received on a master channel and one or more secondary channels, with data receivers replacing transmitters, FFT blocks replacing IFFT blocks and a data combiner replacing the data distributor.

Figure 4:
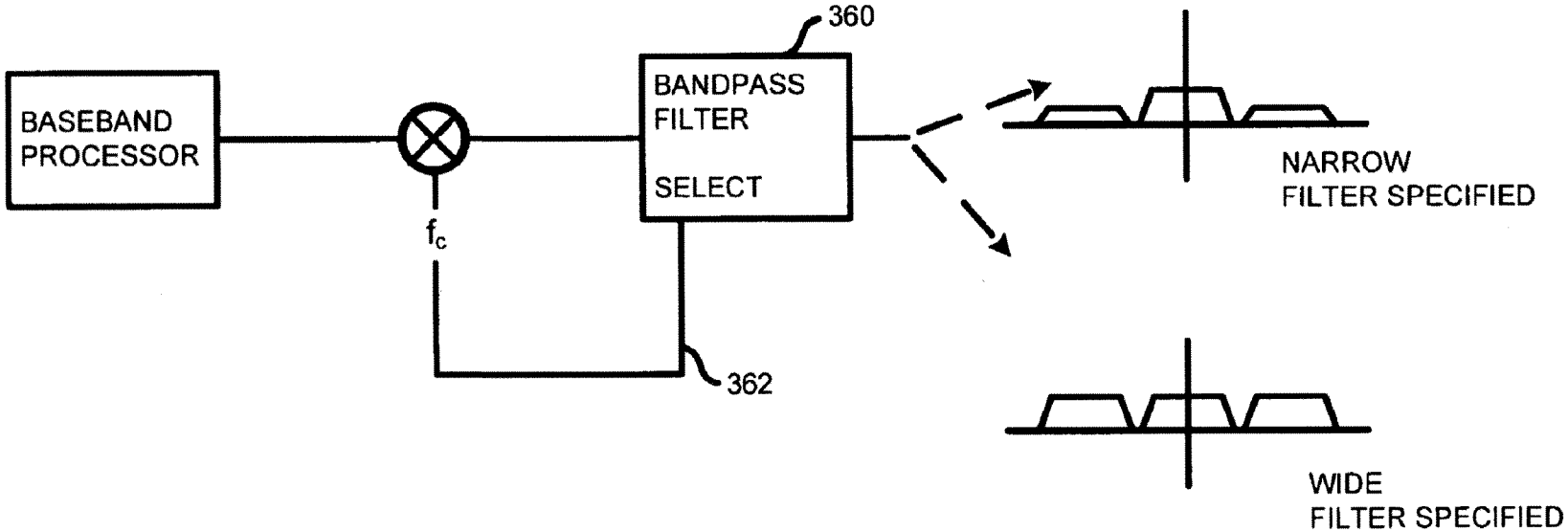
FIG. 4 is a diagram illustrating a selectable band pass filter.

FIG. 4 shows in block diagram and frequency spectrum form the use of the selectable bandpass filter (BFP) 360. Select line 362 chooses either narrow or wide mode. In the embodiments above, the narrow setting imposes a single-channel-wide bandpass shape on the transmitted signal in order to attenuate spurious signals in adjacent channels when they are not in active use. When select line 362 chooses wide mode, the BPF 360 imposes a 3-channel-wide bandpass shape on the transmitted signal. In some embodiments, both filter bandpass shapes share a common center frequency. A coincident center frequency configuration is easier to design and manufacture.

When an access point transceiver and a client transceiver seek to communicate, the client, in accordance with existing standards and practice, would listen for a beacon signal from the access point and then enter into an exchange that establishes an association. An example of the association process is to described in §11.3 of the IEEE-802.11-1999 standard. Various extensions of the association process allow for vendor-specific features to be advertised to and accepted by a client device (for example, Atheros Communications' existing "Turbo Mode"). The channel binding feature is similarly treated as another form of vendor-specific extension to the association process.

The present invention has been described above in connection with a preferred embodiment thereof; however, this has been done for purposes of illustration only, and the invention is not so limited. Indeed, variations of the invention will be readily apparent to those skilled in the art and also fall within the scope of the invention.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

[1. A method of sending data over a wireless data channel including:

obtaining master channel data and secondary channel data;

processing the master channel data into a first baseband encoded signal associated with a master channel;

processing using a processing circuit the secondary channel data into a second baseband encoded signal associated with a secondary channel;

binding the master channel and the secondary channel at least in part by combining the first baseband encoded signal and the second baseband encoded signal into a combined baseband encoded signal, wherein multiple channels are bound if a single wireless association is used to instantiate the master channel and the secondary channel;

upconverting the combined baseband encoded signal to a transmit frequency to obtain a transmit signal; and sending the transmit signal over the wireless data channel;

wherein:

the number of secondary channels is even;

only the master channel is used to negotiate wireless association; and the master channel and the secondary channel carry independent data packets and wherein transmitting of the independent data packets results in the transmit duration on the master channel being substantially the same or greater than the transmit duration on the secondary channel.]

2. [The] *A* method of [claim 1] *sending data over a wireless data channel including:*

*obtaining master channel data and secondary channel data;*

*processing the master channel data into a first baseband encoded signal associated with a master channel;*

*processing using a processing circuit the secondary channel data into a second baseband encoded signal associated with a secondary channel;*

*binding the master channel and the secondary channel at least in part by combining the first baseband encoded signal and the second baseband encoded signal into a combined baseband encoded signal, wherein multiple channels are bound if a single wireless association is used to instantiate the master channel and the secondary channel, and wherein the master channel and the secondary channel carry redundant data packets and wherein the redundant data packets are combined to reduce an estimate of decoded bit error;*

*upconverting the combined baseband encoded signal to a transmit frequency to obtain a transmit signal; and*

*sending the transmit signal over the wireless data channel,*

*wherein only the master channel is used to negotiate wireless association,* wherein the master channel and the secondary channel appear offset in frequency during transmission, *and wherein an operation of a wireless data transmitter is selected from a group of operating conditions consisting of:*

*a) only the master channel transmits a beacon signal,*

*b) only the master channel responds to a probe signal to initiate a MAC negotiation,*

*c) the master channel provides flow control for the master channel and any secondary channel, and*

*d) the master channel and the secondary channel carry common-coded data packets.*

3. [The] *A* method of [claim 1] *sending data over a wireless data channel including:*

*obtaining master channel data and secondary channel data;*

*processing the master channel data into a first baseband encoded signal associated with a master channel;*

*processing using a processing circuit the secondary channel data into a second baseband encoded signal asociated with a secondary channel;*

*binding the master channel and the secondary channel at least in part by combining the first baseband encoded signal and the second baseband encoded signal into a combined baseband encoded signal, wherein multiple channels are bound if a single wireless association is used to instantiate the master channel and the secondary channel, and wherein the master channel and the secondary channel carry redundant data packets and wherein the redundant data packets are combined to reduce an estimate of decoded bit error;*

*upconverting the combined baseband encoded signal to a transmit frequency to obtain a transmit signal; and*

*sending the transmit signal over the wireless data channel,*

*wherein only the master channel is used to negotiate wireless association,* wherein [the] *a* separation of [the] *a plurality of* secondary channels spans an odd number of unused channels, *and wherein an operation of a wireless data transmitter is selected from a group of operating conditions consisting of:*

*a) only the master channel transmits a beacon signal,*

*b) only the master channel responds to a probe signal to initiate a MAC negotiation,*

*c) the master channel provides flow control for the master channel and any secondary channel, and*

*d) the master channel and the secondary channel carry common-coded data packets.*

[4. The method of claim 1 wherein only the master channel transmits a beacon signal.]

[5. The method of claim 1 wherein only the master channel responds to a probe signal to initiate a MAC negotiation.]

[6. The method of claim 1 wherein the master channel provides flow control for the master channel and the secondary channel.]

[7. The method of claim 1 wherein the master channel and the secondary channel carry common-coded data packets.]

[8. The method of claim 1 wherein the master channel and the secondary channel carry redundant data packets.]

[9. The method of claim 1 wherein the master channel and the secondary channel carry redundant data packets and wherein the redundant data packets are combined to minimize an estimate of decoded bit error.]

[10. A wireless data transmitter including:

a data distributor configured to obtain master channel data and secondary channel data;

a first processing circuit configured to process the master channel data into a first baseband encoded signal associated with a master channel;

a second processing circuit configured to process the secondary channel data into a second baseband encoded signal associated with a secondary channel;

a summing circuit configured to combine the master channel and the secondary channel at least in part by combining the first baseband encoded signal and the second baseband encoded signal into a combined baseband encoded signal, wherein multiple channels are bound if a single wireless association is used to instantiate the master channel and the secondary channel;

a mixer configured to upconvert the combined baseband encoded signal to a transmit frequency to obtain a transmit signal; and an antenna configured to the transmit signal over the wireless data channel;

wherein:

the number of secondary channels is even;

only the master channel is used to negotiate wireless association; and the master channel and the secondary channel carry independent data packets and wherein transmitting of the independent data packets results in the transmit duration on the master channel being substantially the same or greater than the transmit duration on the secondary channel.]

11. [The] *A* wireless data transmitter [of claim 10] *including:*

*a data distributor configured to obtain master channel data and secondary channel data;*

*a first processing circuit configured to process the master channel data into a first baseband encoded signal associated with a master channel;*

*a second processing circuit configured to process the secondary channel data into a second baseband encoded signal associated with a secondary channel;*

*a summing circuit configured to combine the master channel and the secondary channel at least in part by combining the first baseband encoded signal and the second baseband encoded signal into a combined baseband*

*encoded signal, wherein multiple channels are bound if a single wireless association is used to instantiate the master channel and the secondary channel, wherein the master channel and the secondary channel carry redundant data packets and wherein the redundant data packets are combined to reduce an estimate of decoded bit error;*

*a mixer configured to upconvert the combined baseband encoded signal to a transmit frequency to obtain a transmit signal; and*

*an antenna configured to transmit the transmit signal over a wireless data channel;*

*wherein, only the master channel is used to negotiate wireless association,* wherein the master channel and the secondary channel appear offset in frequency during transmission, *and wherein an operation of the wireless data transmitter is selected from a group of operating conditions consisting of:*

*a) only the master channel transmits a beacon signal,*

*b) only the master channel responds to a probe signal to initiate a MAC negotiation,*

*c) the master channel provides flow control for the master channel and any secondary channel, and*

*d) the master channel and the secondary channel carry common-coded data packets.*

12. [The] *A* wireless data transmitter [of claim 10] *including:*

*a data distributor configured to obtain master channel data and secondary channel data;*

*a first processing circuit configured to process the master channel data into a first baseband encoded signal associated with a master channel;*

*a second processing circuit configured to process the secondary channel data into a second baseband encoded signal associated with a secondary channel;*

*a summing circuit configured to combine the master channel and the secondary channel at least in part by combining the first baseband encoded signal and the second baseband encoded signal into a combined baseband encoded signal, wherein multiple channels are bound if a single wireless association is used to instantiate the master channel and the secondary channel, wherein the master channel and the secondary channel carry redundant data packets and wherein the redundant data packets are combined to reduce an estimate of decoded bit error;*

*a mixer configured to upconvert the combined baseband encoded signal to a transmit frequency to obtain a transmit signal; and*

*an antenna configured to transmit the transmit signal over a wireless data channel;*

*wherein, only the master channel is used to negotiate wireless association,* wherein [the] *a* separation of [the] *a plurality of* secondary channels spans an odd number of unused channels, *and wherein an operation of the wireless data transmitter is selected from a group of operating conditions consisting of:*

*a) only the master channel transmits a beacon signal,*

*b) only the master channel responds to a probe signal to initiate a MAC negotiation,*

*c) the master channel provides flow control for the master channel and any secondary channel, and*

*d) the master channel and the secondary channel carry common-coded data packets.*

[13. The wireless data transmitter of claim 10 wherein only the master channel transmits a beacon signal.]

[14. The wireless data transmitter of claim 10 wherein only the master channel responds to a probe signal to initiate a MAC negotiation.]

[15. The wireless data transmitter of claim 10 wherein the master channel provides flow control for the master channel and the secondary channel.]

[16. The wireless data transmitter of claim 10 wherein the master channel and the secondary channel carry common-coded data packets.]

[17. The wireless data transmitter of claim 10 wherein the master channel and the secondary channel carry redundant data packets.]

[18. The wireless data transmitter of claim 10 wherein the master channel and the secondary channel carry redundant data packets and wherein the redundant data packets are combined to minimize an estimate of decoded bit error.]

*19. A method of sending data over a wireless data channel, the method comprising:*

*obtaining master channel data and secondary channel data;*

*processing the master channel data into a first baseband encoded signal associated with a master channel;*

*processing using a processing circuit the secondary channel data into a second baseband encoded signal associated with a secondary channel;*

*binding the master channel and the secondary channel at least in part by combining the first baseband encoded signal and the second baseband encoded signal into a combined baseband encoded signal, wherein multiple channels are bound if a single wireless association is used to instantiate the master channel and the secondary channel, wherein the master channel and the secondary channel carry redundant data packets and wherein the redundant data packets are combined to reduce an estimate of decoded bit error, and wherein the first baseband encoded signal is configured to negotiate MAC association for the master channel and any secondary channel;*

*upconverting the combined baseband encoded signal to a transmit frequency to obtain a transmit signal; and*

*sending the transmit signal over the wireless data channel, wherein the master channel and the secondary channel appear offset in frequency during transmission, and wherein an operation of a wireless data transmitter is selected from a group of operating conditions consisting of:*

*a) only the master channel transmits a beacon signal,*

*b) only the master channel responds to a probe signal to initiate a MAC negotiation,*

*c) the master channel provides flow control for the master channel and any secondary channel, and*

*d) the master channel and the secondary channel carry common-coded data packets.*

*20. A method of sending data over a wireless data channel, the method comprising:*

*obtaining master channel data and secondary channel data;*

*processing the master channel data into a first baseband encoded signal associated with a master channel;*

*processing using a processing circuit the secondary channel data into a second baseband encoded signal associated with a secondary channel;*

*binding the master channel and the secondary channel at least in part by combining the first baseband encoded signal and the second baseband encoded signal into a combined baseband encoded signal, wherein multiple channels are bound if a single wireless association is used to instantiate the master channel and the secondary*

*channel, wherein the master channel and the secondary channel carry redundant data packets and wherein the redundant data packets are combined to reduce an estimate of decoded bit error, and wherein the first baseband encoded signal is configured to negotiate MAC association for the master channel and any secondary channel;*

*upconverting the combined baseband encoded signal to a transmit frequency to obtain a transmit signal; and*

*sending the transmit signal over the wireless data channel, wherein a separation of a plurality of secondary channels spans an odd number of unused channels, and wherein an operation of a wireless data transmitter is selected from a group of operating conditions consisting of:*

*a) only the master channel transmits a beacon signal,*

*b) only the master channel responds to a probe signal to initiate a MAC negotiation,*

*c) the master channel provides flow control for the master channel and any secondary channel, and*

*d) the master channel and the secondary channel carry common-coded data packets.*

*21. A wireless data transmitter including:*

*a data distributor configured to obtain master channel data and secondary channel data;*

*a first processing circuit configured to process the master channel data into a first baseband encoded signal associated with a master channel, wherein the first baseband encoded signal is configured to negotiate MAC association for the master channel and any secondary channel;*

*a second processing circuit configured to process the secondary channel data into a second baseband encoded signal associated with a secondary channel;*

*a summing circuit configured to combine the master channel and the secondary channel at least in part by combining the first baseband encoded signal and the second baseband encoded signal into a combined baseband encoded signal, wherein multiple channels are bound if a single wireless association is used to instantiate the master channel and the secondary channel, and wherein the master channel and the secondary channel carry redundant data packets and wherein the redundant data packets are combined to reduce an estimate of decoded bit error;*

*a mixer configured to upconvert the combined baseband encoded signal to a transmit frequency to obtain a transmit signal; and*

*an antenna configured to transmit the transmit signal over a wireless data channel, wherein the master channel and the secondary channel appear offset in frequency during transmission, and wherein an operation of the wireless data transmitter is selected from a group of operating conditions consisting of:*

*a) only the master channel transmits a beacon signal,*

*b) only the master channel responds to a probe signal to initiate a MAC negotiation,*

*c) the master channel provides flow control for the master channel and any secondary channel, and*

*d) the master channel and the secondary channel carry common-coded data packets.*

*22. A wireless data transmitter including:*

*a data distributor configured to obtain master channel data and secondary channel data;*

*a first processing circuit configured to process the master channel data into a first baseband encoded signal associated with a master channel, wherein the first baseband encoded signal is configured to negotiate MAC association for the master channel and any secondary channel;*

*a second processing circuit configured to process the secondary channel data into a second baseband encoded signal associated with a secondary channel;*

*a summing circuit configured to combine the master channel and the secondary channel at least in part by combining the first baseband encoded signal and the second baseband encoded signal into a combined baseband encoded signal, wherein multiple channels are bound if a single wireless association is used to instantiate the master channel and the secondary channel, and wherein the master channel and the secondary channel carry redundant data packets and wherein the redundant data packets are combined to reduce an estimate of decoded bit error;*

*a mixer configured to upconvert the combined baseband encoded signal to a transmit frequency to obtain a transmit signal; and*

*an antenna configured to transmit the transmit signal over a wireless data channel, wherein a separation of a plurality of secondary channels spans an odd number of unused channels, and wherein an operation of the wireless data transmitter is selected from a group of operating conditions consisting of:*

*a) only the master channel transmits a beacon signal,*

*b) only the master channel responds to a probe signal to initiate a MAC negotiation,*

*c) the master channel provides flow control for the master channel and any secondary channel, and*

*d) the master channel and the secondary channel carry common-coded data packets.*

*23. A method of sending data over a wireless data channel, the method including:*

*obtaining master channel data and secondary channel data;*

*processing the master channel data into a first baseband encoded signal associated with a master channel;*

*processing using a processing circuit the secondary channel data into a second baseband encoded signal associated with a secondary channel;*

*binding the master channel and the secondary channel at least in part by combining the first baseband encoded signal and the second baseband encoded signal into a combined baseband encoded signal, wherein multiple channels are bound if a single wireless association is used to instantiate the master channel and the secondary channel, and wherein the master channel and the secondary channel carry redundant data packets and wherein the redundant data packets are combined to reduce an estimate of decoded bit error;*

*upconverting the combined baseband encoded signal to a transmit frequency to obtain a transmit signal; and*

*sending the transmit signal over the wireless data channel, wherein a transmit duration on the master channel is substantially the same or greater than a transmit duration on the secondary channel, wherein the master channel and the secondary channel appear offset in frequency during transmission, and wherein an operation of a wireless data transmitter is selected from a group of operating conditions consisting of:*

*a) only the master channel transmits a beacon signal,*

*b) only the master channel responds to a probe signal to initiate a MAC negotiation,*

*c) the master channel provides flow control for the master channel and any secondary channel, and*

*d) the master channel and the secondary channel carry common-coded data packets.*

*24. A method of sending data over a wireless data channel, the method including:*

*obtaining master channel data and secondary channel data;*

*processing the master channel data into a first baseband encoded signal associated with a master channel;*

*processing using a processing circuit the secondary channel data into a second baseband encoded signal associated with a secondary channel;*

*binding the master channel and the secondary channel at least in part by combining the first baseband encoded signal and the second baseband encoded signal into a combined baseband encoded signal, wherein multiple channels are bound if a single wireless association is used to instantiate the master channel and the secondary channel, and wherein the master channel and the secondary channel carry redundant data packets and wherein the redundant data packets are combined to reduce an estimate of decoded bit error;*

*upconverting the combined baseband encoded signal to a transmit frequency to obtain a transmit signal; and*

*sending the transmit signal over the wireless data channel, wherein a transmit duration on the master channel is substantially the same or greater than a transmit duration on the secondary channel, wherein a separation of a plurality of secondary channels spans an odd number of unused channels, and wherein an operation of a wireless data transmitter is selected from a group of operating conditions consisting of:*

*a) only the master channel transmits a beacon signal,*

*b) only the master channel responds to a probe signal to initiate a MAC negotiation,*

*c) the master channel provides flow control for the master channel and any secondary channel, and*

*d) the master channel and the secondary channel carry common-coded data packets.*

*25. A wireless data transmitter including:*

*a data distributor configured to obtain master channel data and secondary channel data;*

*a first processing circuit configured to process the master channel data into a first baseband encoded signal associated with a master channel;*

*a second processing circuit configured to process the secondary channel data into a second baseband encoded signal associated with a secondary channel;*

*a summing circuit configured to combine the master channel and the secondary channel at least in part by combining the first baseband encoded signal and the second baseband encoded signal into a combined baseband encoded signal, wherein multiple channels are bound if a single wireless association is used to instantiate the master channel and the secondary channel, and wherein the master channel and the secondary channel carry redundant data packets and wherein the redundant data packets are combined to reduce an estimate of decoded bit error;*

*a mixer configured to upconvert the combined baseband encoded signal to a transmit frequency to obtain a transmit signal; and*

*an antenna configured to transmit the transmit signal over a wireless data channel, wherein a transmit duration on the master channel is substantially the same or greater than a transmit duration on the secondary channel, wherein the master channel and the secondary channel appear offset in frequency during transmission, and wherein an operation of the wireless data transmitter is selected from a group of operating conditions consisting of:*

*a) only the master channel transmits a beacon signal,*

*b) only the master channel responds to a probe signal to initiate a MAC negotiation,*

*c) the master channel provides flow control for the master channel and any secondary channel, and*

*d) the master channel and the secondary channel carry common-coded data packets.*

*26. A wireless data transmitter including:*

*a data distributor configured to obtain master channel data and secondary channel data;*

*a first processing circuit configured to process the master channel data into a first baseband encoded signal associated with a master channel;*

*a second processing circuit configured to process the secondary channel data into a second baseband encoded signal associated with a secondary channel;*

*a summing circuit configured to combine the master channel and the secondary channel at least in part by combining the first baseband encoded signal and the second baseband encoded signal into a combined baseband encoded signal, wherein multiple channels are bound if a single wireless association is used to instantiate the master channel and the secondary channel, and wherein the master channel and the secondary channel carry redundant data packets and wherein the redundant data packets are combined to reduce an estimate of decoded bit error;*

*a mixer configured to upconvert the combined baseband encoded signal to a transmit frequency to obtain a transmit signal; and*

*an antenna configured to transmit the transmit signal over a wireless data channel, wherein a transmit duration on the master channel is substantially the same or greater than a transmit duration on the secondary channel, wherein a separation of a plurality of secondary channels spans an odd number of unused channels, and wherein an operation of the wireless data transmitter is selected from a group of operating conditions consisting of:*

*a) only the master channel transmits a beacon signal,*

*b) only the master channel responds to a probe signal to initiate a MAC negotiation,*

*c) the master channel provides flow control for the master channel and any secondary channel, and*

*d) the master channel and the secondary channel carry common-coded data packets.*

* * * * *